United States Patent [19]

Tanaka et al.

[11] Patent Number: 4,626,451
[45] Date of Patent: Dec. 2, 1986

[54] METHOD OF MANUFACTURING SINTERED CERAMIC BODY

[75] Inventors: Shun-ichiro Tanaka; Kazuo Ikeda; Akio Sayano, all of Yokohama, Japan

[73] Assignee: Tokyo Shibaura Denki Kabushiki Kaisha, Kawasaki, Japan

[21] Appl. No.: 593,304

[22] Filed: Mar. 26, 1984

[30] Foreign Application Priority Data

Mar. 29, 1983 [JP] Japan ................................. 58-53420

[51] Int. Cl.⁴ .......................... B05D 1/18; B05D 3/02; B05D 5/12
[52] U.S. Cl. .................................. 427/123; 427/126.2; 427/229
[58] Field of Search ..................... 427/243, 123, 126.2, 427/229, 230, 237, 238, 443.2; 264/60

[56] References Cited

U.S. PATENT DOCUMENTS

| 3,074,143 | 1/1963 | Smith | 25/156 |
| 3,661,595 | 5/1972 | Buck | 106/1 |
| 4,108,652 | 8/1978 | Ogawa et al. | 428/74 X |
| 4,234,367 | 11/1980 | Herron et al. | 427/96 X |
| 4,283,441 | 8/1981 | Haecker et al. | 427/126.5 |

FOREIGN PATENT DOCUMENTS 1438559 6/1976 United Kingdom .

OTHER PUBLICATIONS

Chemical Abstracts, vol. 93, No. 16, Oct. 20, 1980, p. 286, No. 154759m, Columbus, Ohio, U.S. & JP-A-80 51 774, (Kyoto Ceramic Co., Ltd.), 15-04-1980 Abstract.
Chemical Abstracts, vol. 98, No. 18, May 2, 1983, p. 311, No. 148509s, Columbus, Ohio, US; & JP-A-57 160 984, (NGK Spark Plug Co., Ltd.), 04-10-1982-Abstract.
Chemical Abstracts, vol. 93, No. 16, Oct. 20, 1980, p. 285, No. 154758k, Columbus, Ohio, US; & JP-A-80 51 775, (Kyoto Ceramic Co., Ltd.), 15-04-1980-Abstract.
Chemical Abstracts, vol. 96, No. 8, Feb. 22, 1982, p. 301, No. 56808u, Columbus, Ohio, US; & JP-A-81 120 585, (NGK Spark Plug Co., Ltd.), 21-09-1981.

Primary Examiner—Shrive P. Beck
Attorney, Agent, or Firm—Cushman, Darby & Cushman

[57] ABSTRACT

A method of manufacturing a sintered ceramic body which has a conductive layer and which is suitable for bonding with a metal member, has the steps of coating at least part of a surface of an unsintered ceramic powder compact with a coating material which has a melting point or decomposition point higher than a sintering temperature of the compact and which is selected from the group consisting of a metal, a metal salt, a conductive inorganic material and a nonconductive inorganic material which becomes conductive after sintering, and sintering a resultant structure, thus forming the sintered ceramic body having a conductive layer on at least part of the surface thereof.

9 Claims, No Drawings

METHOD OF MANUFACTURING SINTERED CERAMIC BODY

BACKGROUND OF THE INVENTION

The present invention relates to a method of manufacturing a sintered ceramic body having a conductive layer thereon which is suitable for bonding with a metal member, especially a steel member.

A typical conventional method of bonding a sintered ceramic body to a metal member comprises applying an Mo-Mn paste or the like to a surface of the sintered ceramic body which is to be bonded, sintering the resultant structure in a reducing atmosphere to form a conductive layer which can be electroplated on this surface, electroplating nickel on the conductive layer and bonding an electroplated nickel layer to the metal member by brazing.

This method is very effective when the ceramic body comprises an oxide series sintered body such as alumina, but is not suitable when an non-oxide series sintered body such as silicon nitride is used. In particular, when a metal member comprises steel, direct bonding through diffusion cannot be substantially achieved at low temperature. When the steel member is bonded at high temperature, properties of the steel member is greatly degraded, resulting in inconvenience.

Since a non-oxide series sintered ceramic body such as a silicon nitride sintered body has good wearing and high-temperature properties, this sintered body shows promise for application in automobile parts and gas turbine parts. A strong demand has arisen for establishing a technique for bonding such a non-oxide series ceramic body with a metal member, especially a steel member.

SUMMARY OF THE INVENTION

It is an object of the present invention to provide a method of manufacturing a sintered ceramic body suitable for bonding with a metal member, especially a steel member.

In order to achieve the above object of the present invention, there is provided a method of manufacturing sintered ceramic body, comprising the steps of coating at least part of a surface of an unsintered ceramic powder compact with a coating material which has a melting point or decomposition point higher than a sintering temperature of said compact, and which is selected from the group consisting of a metal, a metal salt, a conductive inorganic material and a nonconductive inorganic material which becomes conductive after sintering, and sintering a resultant structure, thus forming the sintered ceramic body having a conductive layer on said at least part of said surface thereof.

A ceramic material used in the present invention comprises an oxide series ceramic material such as alumina, silica, titania or zirconia, or a non-oxide series ceramic material such as silicon nitride, silicon carbide or SIALON.

The use of, particularly, non-oxide series ceramic materials is effective in that it is possible to utilize the wearing and high temperature properties of the ceramic materials. It should also be noted that, when it comes to, particularly, silicon ceramics such as silicon nitride and SIALON, a conductive layer of a silicide such as $Mo_5Si_3$ or $W_5Si_3$ can be easily formed on the surface of the sintered body. Further, in the case of nitride ceramics such as silicon nitride, a conductive layer of a nitride such as TiN or ZrN can be easily formed on the surface of the sintered body.

According to the method of the present invention, the material coated on the surface of the ceramic powder compact comprises a metal such as Ti, Zr, Hf, V, Nb, Ta, Cr, Mo or W which is selected from the metal elements belonging to Groups IV, V, VI, VII and VIII of the Periodic Table and which has a melting point, decomposition point or sublimation point higher than the sintering temperature. The coating material may comprise a metal salt such as a nitrate, a nitrite, a sulfate, a sulfite, a borate, a carbonate, a silicate, a phosphate, a phosphite, a chloride, a fluoride, a chlorate, an ammonium salt, an oxalate, a hydroxide, a hydride, an iodide, a bromide, or an alkoxide of a metal selected from the above-mentioned metals. These metals or metal salts can be used singly or as a mixture containing at least two metals or metal salts. The conductive inorganic material is selected from a silicide, a carbide, a boride, a nitride or an oxide of the above-mentioned metals and can be exemplified by molybdenum silicide ($MoSi_2$, $Mo_5Si_3$), tungsten silicide ($WSi_2$, $W_5Si_3$), tungsten carbide (WC), molybdenum carbide ($Mo_2C$), titanium nitride (TiN), or zirconium nitride (ZrN). The conductive inorganic material may comprise carbon. The nonconductive inorganic material which becomes conductive after sintering comprises $TiO_2$, $ZrO_2$ or the like. $TiO_2$ and $ZiO_2$ form conductive materials TiN and ZrN, respectively, after being sintered in a nitrogen atmosphere. It is desirable to select a material having high strength and toughness from among these materials. Composite material containing these material may be effectively used.

To be "conductive" in the present invention is to have a specific resistance of 1 k$\Omega$cm or less, preferably 1 $\Omega$cm or less.

A reinforcing material (e.g., glass fiber) or a reaction accelerator (e.g., calcium oxide or calcium phosphate) may be added in the amount of less than 50% by weight to the material coated on the surface of the ceramic powder compact.

DETAILED DESCRIPTION OF THE PREFERRED EMBODIMENT

A method of the present invention will be described in detail hereinafter.

A material which serves as a conductive layer after sintering is coated on the surface of an unsintered ceramic powder compact. The unsintered ceramic powder compact signifies a formed body prepared by adding a sintering accelerator and an organic binder to ceramic powder and forming the mixture, a body obtained by degreasing this formed body, or a body obtained by presintering this degreased body. A material suspension is coated on the surface of the unsintered ceramic powder compact. Alternatively, the powder compact is dipped in this suspension, or a paste material is coated on the surface of the powder compact, or a powdered material is applied by a step press to the surface of the powder compact. In addition, the coating may be deposited by chemical vapor deposition or physical vapor deposition on the surface of the powder compact. When a metal salt soluble in a given solvent is used as the coating material, a solution prepared by dissolving this metal salt in the given solvent is applied to the surface of the powder compact, or the powder compact is dipped in this solution. The conductive layer preferably contains at least 50% by volume of conductive material.

The ceramic powder compact coated with a predetermined material is heated in a non-oxidizing atmosphere, thereby obtained a ceramic body having a conductive layer thereon. A sintering temperature can be that of a typical ceramic material, and falls within the range of 1500° to 2000° C., more preferably 1700° to 2000° C. when the ceramic powder compact contains $Si_3N_4$ as a main component.

The present invention will now be described by way of examples.

EXAMPLE 1

An organic binder (paraffin) was added to a powder mixture comprising 5% by weight of yttrium oxide and 4% by weight of aluminum oxide, 3% by weight of aluminum nitride and 1.5% by weight of titanium oxide as sintering accelerators. A resultant mixture was formed in molds to obtain a formed body.

This formed body was degreased and presintered at a temperature of about 350° C., and a paste containing molybdenum as a major constituent was coated on the resultant body and was presintered in a nitrogen atmosphere at a temperature of 800° C. for two hours. Thereafter, the presintered body was sintered in the nitrogen atmosphere at a temperature of 1,700° to 1,800° C. to form a conductive layer on a silicon nitride series sintered ceramic body. This conductive layer comprises mainly Mo and $Mo_5Si_3$.

Nickel was electroplated on the conductive layer of the sintered ceramic body and on an iron member (SS41). The sintered ceramic body and the iron member were baked in a forming gas at a temperature of about 700° C. A silver brazing agent was inserted between the sintered ceramic body and the iron member and was brazed at a temperature causing the brazing agent to melt, thereby bonding the sintered ceramic body and the iron member together. The bonding strength was measured to be not less than 560 kg/cm² by shear.

EXAMPLE 2

The silicon nitride series formed body prepared in Example 1 was presintered in a nitrogen atmosphere at a temperature of 1,350° C. for two hours. The resultant body was dipped in a suspension containing molybdenum powder for about 30 seconds and was then removed from the suspension. Thereafter, the resultant body was placed in the nitrogen atmosphere at a temperature of 1,700° to 1,800° C. to form a conductive layer on the surface of the sintered ceramic body. This conductive layer comprises mainly Mo and $Mo_5Si_3$.

The sintered ceramic body having the conductive layer was bonded to the iron member in the same manner as in Example 1. The bonding strength was measured to be 520 kg/cm².

EXAMPLE 3

The silicon nitride series presintered body obtained in Example 2 was dipped in an aqueous solution of phosphomolybdic acid for about 15 seconds and was sintered in a nitrogen atmosphere at a temperature of 1,700° to 1,800° C. to form a conductive layer on the sintered ceramic body.

The resultant sintered ceramic body having the conductive layer thereon was bonded to the iron member in the same manner as in Example 1. The bonding strength was measured to be 400 kg/cm².

EXAMPLES 4 AND 5

Paraffin was mixed as an organic binder with silicon nitride series powder (containing as sintering accelerators 5% by weight of yttrium oxide and 2% by weight of aluminum oxide), and a trichlene solvent was evaporated. The resultant powder was sieved by a sieve. The sieved powder was filled into molds such that a top surface thereof became flat.

In one case, tungsten powder was poured on top of the silicon nitride series powder. The resultant powder layers was pressed and hot-pressed at a temperature of 1,740° C. for one hour to prepare a ceramic body having a conductive layer thereon. This conductive layer comprises mainly W and $W_5Si_3$.

In an additional case, molybdenum powder was used in place of tungsten powder to prepare another ceramic body having a different conductive layer (Mo, $Mo_5Si_3$) thereon.

The resultant sintered ceramic bodies having different conductive layers were respectively bonded to iron members, in the same manner as in Example 1. The bonding strengths of these bonded bodies were measured to be not less than 620 kg/cm² (in the case when tungsten powder was used) and not less than 660 kg/cm² (in the case when molybdenum powder was used).

EXAMPLES 6 TO 11

Various sintered ceramic bodies having different conductive layer were prepared and bonded to iron members, in the same manner as in Examples 1 to 5. Table 1 shows conditions for preparating the ceramic bodies. The bonding strengths of these bonded bodies were similar to that in Examples 1 to 5.

TABLE 1

| Example No. | Ceramic powder compact | Coating material | Coating method | Main component of conductive layer |
|---|---|---|---|---|
| 6 | formed body of $Si_3N_4$ | powder of WC | pressing | WC, $W_5Si_3$ |
| 7 | formed body of $Si_3N_4$ | powder of $Mo_2C$ | pressing | $Mo_2C$, $Mo_5Si_3$ |
| 8 | pre-sintered body of $Si_3N_4$ | suspension of $TiO_2$ | dipping | TiN |
| 9 | pre-sintered body of $Si_3N_4$ | suspension of $ZrO_2$ | dipping | ZrN |
| 10 | pre-sintered body of SIALON | aqueous solution of phosphomolybdic acid | dipping | $Mo_5Si_3$ |
| 11 | pre-sintered body of SIALON | suspension of $TiO_2$ | dipping | TiN |

According to the method of the present invention, a conductive film was formed on a unsintered, porous ceramic powder compact, and the resultant structure was sintered. Therefore, a rigid conductive layer was formed on the surface of the resultant sintered ceramic body. Unlike in the conventional method, a sintered ceramic body of this type can be bonded with high bonding strength to a metal member, especially a steel member.

What is claimed is:

1. A method of manufacturing a sintered ceramic body comprising the steps of:
   (a) coating at least part of a surface of an unsintered ceramic powder compact containing a non-oxide series ceramic material as a major constituent with a coating material which has a melting point or decomposition point higher than a sintering temperature of said compact, said coating material being a nonconductive inorganic material which becomes conductive after sintering; and
   (b) sintering the coated ceramic powder compact thus forming the sintered ceramic body having a conductive layer on said at least part of said surface thereof, wherein
   said nonconductive inorganic material which becomes conductive after sintering comprises one of titanium oxide and zirconium oxide and wherein,
   said non-oxide series ceramic material contains silicon ceramics as a major constituent.

2. A method according to claim 1, wherein the step of coating the coating material on said surface of said powder compact comprises a step selected from the group consisting of: a step of coating one of a suspension and paste which contains the coating material to said surface of said powder compact; a step of dipping said powder compact in said suspension containing the coating material; a step of placing and pressing a powder of the coating material on said surface of said powder compact; and a step of depositing the coating material on said surface of said powder compact by means of chemical vapor deposition or physical vapor deposition.

3. A method according to claim 1, wherein the sintering atmosphere comprises a non-oxidizing atmosphere.

4. A method according to claim 3, wherein the non-oxidizing atmosphere comprises a nitrogen atmosphere.

5. A method of manufacturing a sintered ceramic body comprising the steps of:
   (a) coating at least part of a surface of an unsintered ceramic powder compact containing a non-oxide series ceramic material as a major constituent with a coating material which has a melting point or decomposition point higher than a sintering temperature of said compact, said coating material being a metal salt; and
   (b) sintering the coated ceramic powder compact thus forming the sintered ceramic body having a conductive layer on said at least part of said surface thereof, wherein
   coating with the metal salt is performed such that a solution of the metal salt is applied to said surface of said powder compact or said power compact is dipped in the solution of the metal salt.

6. A method according to claim 5 wherein said non-oxide series ceramic material contains silicon ceramics as a major constituent.

7. A method according to claim 5 wherein the metal of the metal salt comprises at least one element selected from the group consisting of elements of Groups IV, V, VI, VII and VIII of the Periodic Table; and the metal salt comprises at least one material selected from the group consisting of a nitrate, a nitrite, a sulfate, a sulfite, a borate, a carbonate, a silicate, a phosphate, a phosphite, a chloride, a fluoride, a chlorate, an ammonium salt, an oxalate, a hydroxide, a hydride, an iodide, a bromide and an alkoxide of said metal.

8. A method according to claim 7 wherein the metal comprises at least one element selected from the group consisting of titanium, zirconium, hafnium, vanadium, niobium, tantalum, chromium, molybdenum and tungsten.

9. A method according to claim 5 wherein the sintering atmosphere comprises a non-oxiding atmosphere.

* * * * *